United States Patent Office 3,829,469
Patented Aug. 13, 1974

3,829,469
N-HYDROXYARYLALIPHATIC-AMINO-PROPIO-PHENONES AND THE SALTS THEREOF
Kurt Thiele, Frankfurt am Main, and Klaus Posselt, Bergen-Enkheim, Germany, assignors to Deutsche Gold- und Silber-Scheideanstalt vormals Roessler, Frankfurt am Main, Germany
No Drawing. Filed May 5, 1969, Ser. No. 821,952
Int. Cl. C07c 93/06
U.S. Cl. 260—570.5 C 8 Claims

ABSTRACT OF THE DISCLOSURE

Compounds are prepared having the general formula

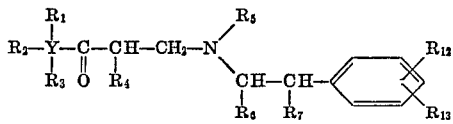

where $R_2$ and $R_3$ are hydrogen, methoxy or nitro, Y is a phenyl or a condensed multi-ring aromatic group one or more rings of which can be partially or completely saturated, $R_4$ is hydrogen, methyl or ethyl, $R_5$ and $R_6$ are hydrogen or methyl, $R_7$ is hydrogen or hydroxy, $R_1$ is —O—alk—OH or

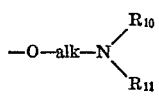

wherein alk is a straight or branch chain alkylene chain of 1 to 6 carbon atoms which can be hydroxy substituted, $R_{10}$ and $R_{11}$ are hydrogen, lower alkyl or lower alkenyl or are joined together with each other or alk to form a 5, 6 or 7 membered closed ring which can contain a further hetero atom such as oxygen, sulfur or nitrogen, $R_{12}$ is hydroxyl or a straight or branched chain lower alkyl group of at least two carbon atoms, $R_{13}$ is hydrogen, hydroxy or a straight or branched chain lower alkyl group with the proviso that if $R_{12}$ is hydroxy $R_{13}$ can be methyl. The compounds have pharmaceutical properties and are suited for the treatment of heart and circulatory conditions.

In Thiele Pat. 3,322,758 there are described compounds of the general formula

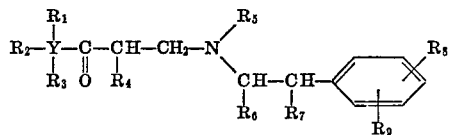

are described wherein $R_2$ and $R_3$ are the same or different and are hydrogen, methoxy or nitro, Y is a phenyl group or a condensed multi-ring aromatic group, one or more rings of which can be partially or completely saturated, such as phenyl, naphthyl, tetrahydronaphthyl, fluorene, anthracene, phenanthrene or decahydronaphthyl, $R_4$ is hydrogen, methyl or ethyl, $R_5$ and $R_6$ are hydrogen or methyl, $R_7$ is hydrogen or hydroxy, $R_8$ and $R_9$ are the same or different and are hydrogen, methyl, methoxy or nitro and $R_1$ is the radical —O—alk—OH or

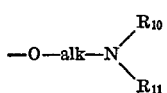

wherein alk is a straight or branch chain alkylene chain of 1 to 6 carbon atoms, possibly hydroxy substituted and $R_{10}$ and $R_{11}$ are the same or different and are hydrogen or lower alkyl which can be joined together with each other or with alk to form a 5, 6 or 7 membered closed ring and such ring, if desired, can contain a further hetero atom such as oxygen, sulfur or nitrogen. The ring furthermore can be substituted by an alkyl, acyl, benzyl, oxyalkyl, alkoxyalkyl, acyloxyalky, carboxyl ester or carbonyl amide group. The alkyl is generally lower alkyl, i.e., it has 1 to 6 carbon atoms. These compounds are effective in treating heart circulatory conditions.

According to the present invention it has now been found that compounds of the general formula

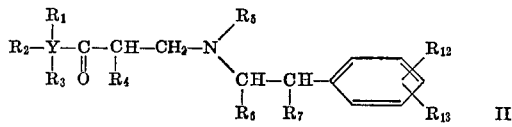

wherein $R_1$ through $R_7$ (as well as $R_{10}$ and $R_{11}$) have the above stated significance and $R_{10}$ and $R_{11}$ aslo can be lower alkenyl, e.g., of 2 to 6 carbon atoms such as vinyl, allyl, methallyl and crotyl, $R_{12}$ is hydroxy or a straight or branched chain lower alkyl group of at least two carbon atoms (2 to 6 carbon atoms) and $R_{13}$ is hydrogen, hydroxy or a straight or branched chain lower alkyl group of at least 2 carbon atoms (2 to 6 carbon atoms) with the proviso that if $R_{12}$ is hydroxy, $R_{13}$ can be methyl, and their pharmacologically acceptable acid addition salts and quaternary ammonium salt as well as their different stereisomeric forms possess valuable properties including the improvement of the heart function. The acid addition salts also can be used to cure resins, e.g. melamine formaldehyde resins, preferably at least one of $R_{12}$ and $R_{13}$ is hydroxyl.

The compounds according to the invention which contain optically active carbon atoms which usually are obtained as racemates can be separated into their optically active isomers or diastereomers by conventional methods. However, optically active isomers or diastereomers can also be used as starting materials in which case the end products contain the corresponding pure optically active form or diastereomer configuration.

The production of compounds of the invention having general formula II can be obtained by
  (a) reacting a compound having the general formula

with a compound having the general formula

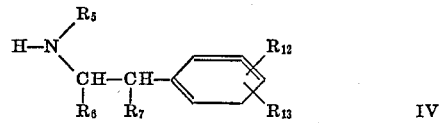

together with formaldehyde or a formaldehyde yielding substance or
  (b) reacting a compound of the general formula

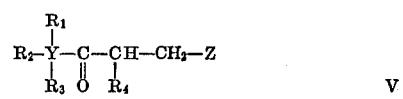

with a compound of the general formula

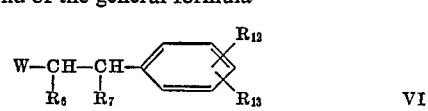

where one of Z and W represents halogen and the other $NHR_5$, in the presence of a basic substance,
  (c) reacting a compound of the general formula

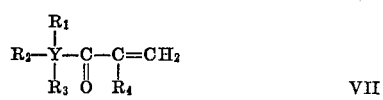

or the corresponding Mannich base of the formula

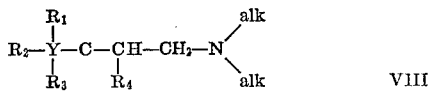

where the groups $R_1$ through $R_4$ have the above-identified significance and the groups alk are lower alkyl groups with a compound of general formula IV; or (d) reacting a compound of the general formula

where Me is alkali metal, e.g. sodium or potassium, or —MgCl, —MgBr or —MgI with a compound of the general formula

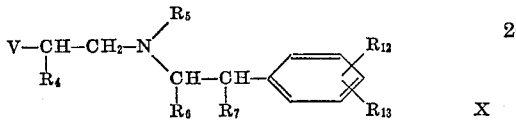

where V is either —CW or COHal (Hal is either Cl or Br).

Typical starting compounds within formula III are

4-[3-dimethylaminopropoxy]-acetophenone,
4-[3-dimethylamino-2-methyl-propoxy]-acetophenon],
4-[2-diallylaminoethoxy]-acetophenone,
3-methoxy-4-(2-dimethylaminoethoxy)-acetophenone,
3-methoxy-5-(3-dimethylaminopropoxy)-acetophenone,
4-[(3-dimethylaminopropoxy)-acetonaphthone-],
3-nitro-4-(4-dibutylaminobutoxy)-propiophenone,
4-(dimethylaminomethoxy)-butyrophenone,
3-(2-hydroxyethoxy)-acetophenone,
4-[5-methyl ethyl amino-2-methylpentoxy]-acetophenone,
3-(2-dimethylaminoethoxy)-acetophenone,
3-(2-diallylaminoethoxy)-acetophenone,
3-(3-dimethylaminopropoxy)-acetophenone,
3-(1-dimethylaminoisopropoxy) acetophenone,
2-(3-diethylaminopropoxy) acetophenone,
3-(3-piperidinopropoxy)-acetophenone,
3-(2-morpholinoethoxy)-acetophenone,
3-methoxy-5-(3-dimethylaminopropoxy) acetophenone,
3-(2,3-dihydroxypropoxy) acetophenone, as well as the corresponding salts, e.g. the hydrochloride and hydrobromides.

Examples of compounds within formula IV are 4-hydroxynorephedrine,
3,4-dihydroxynorephedrine,
3-hydroxynorephedrine,
2,4-dihydroxynorephedrine,
2-methyl-4-hydroxynorephedrine,
4-methyl-2-hydroxynorephedrine,
4-ethylnorephedrine,
4-propylnorephedrine,
3-butylnorephedrine,
3-hexyl-4-hydroxynorephedrine,
3-isopropylnorephedrine,
3-hydroxy-4-sec. butyl norephedrine,
2-hexyl-4-hydroxynorephedrine,
2-(4-hydroxyphenyl)-2-hydroxyethyl amine,
2-(4-hydroxyphenyl) ethylamine,
2-(4-hydroxyphenyl)isopropylamine,
2-(4-hydroxyphenyl)-2-hydroxyethyl N-methylamine as well as the corresponding salts, e.g. the hydrochlorides and hydrobromides.

Examples of compounds within the invention include in addition to the compounds in the following working examples and the corresponding free bases the following free bases as well as the corresponding addition salts, β-[1-(4-hydroxyphenyl)-1-hydroxypropyl-(2)-amino]-3-nitro-4-(4-dibutylaminobutoxy)-butyrophenone,
β-[1-(4-hydroxyphenyl)-1-hydroxypropyl-(2)-amino]-4-(dimethylaminomethoxy]-valerophenone,
β-[1-(4-hydroxyphenyl)-1-hydroxypropyl-(2)-amino]-3-(2-hydroxyethoxy)-propiophenone,
β-[1-(4-hydroxyphenyl)-1-hydroxypropyl-(2)-amino]-4-(4-hydroxybutoxy)-propiophenone,
β-[1-(4-hydroxyphenyl)-1-hydroxypropyl-(2)-amino]-3-(-2-morpholinoethoxy)-propiophenone,
β-[1-(3,4-dihydroxyphenyl)-1-hydroxypropyl-(2)-amino]-4-(3-methylethylaminopropoxy]-propiophenone,
β-[1-(2-methyl-4-hydroxyphenyl)-1-hydroxypropyl-(2)-amino]-4-(dimethallylaminoethoxy]-propiophenone,
β-[1-(4-ethylphenyl)-1-hydroxypropyl-(2)-amino]-4-(dimethylaminoisopropoxy]-propiophenone,
β-[1-(3-hexyl-4-hydroxyphenyl)-1-hydroxypropyl-(2)-amino]-4-(dimethylamino ethoxy]-propiophenone,
β-[1-(4-hydroxyphenyl)-ethyl-(2)-amino]-4-[3-dimethyl-amino-propoxy]propiophenone,
β-[1-(1-(4-hydroxyphenyl)-1-hydroxyethyl-(2)-amino]-4-[3-diisopropylaminobutoxy]-propiophenone,
β-[1-(2-hydroxyphenyl)-1-hydroxyethyl-(2)-methyl-amino]-4-[3-dimethylaminoethoxy]-propiophenone,
β-[1-(4-hydroxyphenyl)-1-hydroxypropyl-(2)-amino]-3-(2,3-dihydroxypropoxy)-propiophenone.

The free bases can be converted into their salts with the usual pharmacologically acceptable acids such as hydrochloric acid, hydrobromic acid, sulfuric acid, phosphoric acid, acetic acid, propionic acid, critic acid, succinic acid, maleic acid, fumaric acid, lactic acid, p-toluene sulfonic acid and the like. The compounds can be converted to their quaternary salts with the usual pharmacologically acceptable quaternizing agents such as the lower alkyl halides, e.g. methyl chloride, methyl bromide, ethyl chloride, ethyl bromide and butyl bromide.

When the acid salts are produced as primary products they can be converted to their free base by treatment with a base such as aqueous potassium carbonate or sodium hydroxide.

In procedure (a) temperatures of 20 to 150° C. are usually employed. Solvents such as alcohols, e.g. ethyl alcohol, methyl alcohol, isopropyl alcohol and butyl alcohol, dioxane (either m-dioxane or p-dioxane), glacial acetic acid and the like can be employed.

Procedure (b) is usually carried out at elevated temperatures, such as, for example, between 80 and 140° C., in a solvent such as an alcohol, ether, dimethyl formamide and the like. Alkali metal alcoholates e.g., sodium ethylate, alkali metal amides e.g., sodamide, alkali metal carbonates e.g., sodium carbonate, and tertiary amines e.g., triethyl amine, for instance, come into consideration as the basic substances.

Procedure (c) when carried out with unsaturated ketone VII is generally carried out at temperatures between 20 and 80° C. in an inert solvent, such as, ether, acetone, dioxane or chloroform and when carried out with the corresponding Mannich base VIII, which during the reaction intermediately decomposes to the unsaturated ketone VII is generally carried out at 30 to 120° C. in a solvent such as water, alcohol/water or a two phase system such as water/benzene or water/toluene.

Procedure (d) is preferably carried out at temperatures between —20 and +80° C. Solvents, such as, ether, dioxane, tetrahydrofurane or benzene can be employed.

The compounds according to the invention possess valuable pharmaceutical properties and are suited for the treatment of heart and circulatory conditions and especially for increasing the coronary blood flow in combination with an improvement in the heart function. The compounds were tested on the isolated guinea pig heart following the method of Langendorff (Pflüger's Arch. *61*, 291, 1895) for their activity on coronary blood flow, contraction amplitude and heart frequency. Their toxicity (LD 50 mg./kg. was tested on mice upon oral or intraperitoneal application by the method of Miller and Tainter (Proc. Soc. exper. Biol. a. Med. 57, 261, 1944).

The compounds according to the invention produce a moderate to strong dilation of the coronary system with a simultaneous increase in contraction amplitude in a dosage range of 5–500 mg./heart. They therefore are suited for improving the function of the heart muscle, as well as the blood flow through the heart muscle.

The dosage range of 5 to 500 mg./heart applies to the isolated Langendorff heart.

The administration of the compounds according to the invention is by the standard modes for administration of compounds which are active in improving coronary blood circulation, such as, for example, enteral, parenteral, oral or perlingual. The dosage rate upon intravenous administration to animals, for example, dogs, is in the range of about 0.5–50 mg./kg.

Pharmacological investigations of the action of the materials of the invention have been made using papaverin as the comparison material.

The compounds of the invention as stated can be used in the production of pharmaceutical compositions. The pharmaceutical compositions or medicament can contain one or more of the compounds of the invention as well as mixtures of these with other pharmaceutically active materials as well as, if desired, additional pharmaceutical carriers. They can be administered in the manner set forth supra.

The individual dosage for human beings, depending on the form of administration are between 0.5 and 100 mg. one or more times a day.

Unless otherwise indicated all parts are by weight.

EXAMPLE 1

β-[1-(4-hydroxyphenyl)-1-hydroxypropyl-(2)-amino]-4-[3-dimethylaminopropoxy]-propiophenone

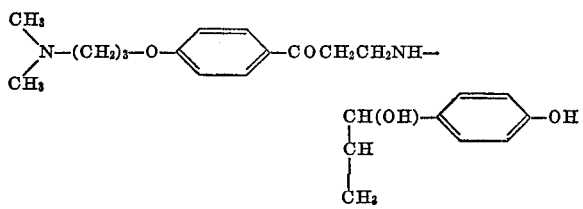

28.2 grams (0.11 mol) of 4-[3-dimethylaminopropoxy]-acetophenone·HCl, 3.9 grams (0.13 mol of paraformaldehyde and 20.3 grams 10.1 mol) of 4-hydroxynorephedrine·HCl were boiled under reflux for 6 hours in 100 ml. of isopropanol. The dihydrochloride precipitated out on cooling and was recrystallized from methanol, M.P. 220° C., yield 9.5 grams.

EXAMPLE 2

β-[1-(4-hydroxyphenyl)-1-hydroxypropyl-(2)-amino]-4-[3-dimethylamino-2-methylpropoxyl] propiophenone

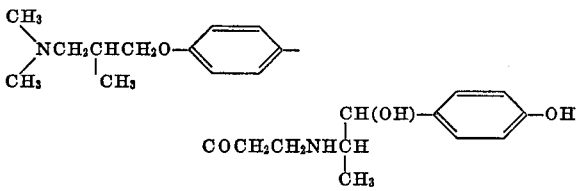

29.9 grams (0.11 mol) of 4-[3-dimethylamino-2-methylpropoxy]-acetophenone·HCl, 3.9 grams (0.13 mol) of paraformaldehyde and 20.3 grams (0.1 mol) of 4-hydroxynorephedrine·HCl were reacted and worked up in the manner described in Example 1. The material precipitating as the dihydrochloride was recrystallized from methanol-ethanol (1:1 by volume), M.P. 205° C., yield 11.8 grams.

EXAMPLE 3

β-[1-(4-hydroxyphenyl)-1-hydroxypropyl-(2)-amino]-4-(2-diallylaminoethoxy)-propiophenone

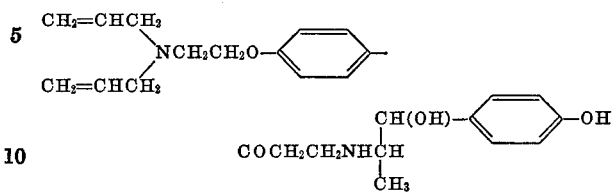

32.5 grams (0.11 mol) of 4-(2-diallylaminoethoxy)-acetophenone·HCl were reacted with 3.9 grams of paraformaldehyde and 20.3 grams of 4-hydroxynorephedrine·HCl and worked up as in Example 1. Yield 15.2 grams of dihydrochloride, M.P. 180–181° C.

EXAMPLE 4

β-[1-(4-hydroxyphenyl)-1-hydroxypropyl-(2)-amino]-3-methoxy-4-(2-dimethylaminoethoxy)-propiophenone

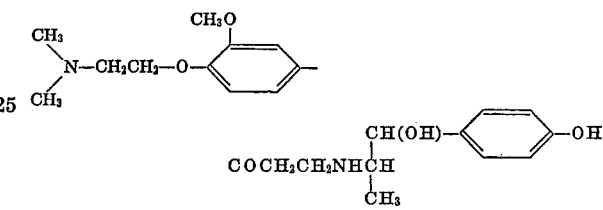

27.4 grams (0.1 mol) of 3 - methoxy-4-(2-dimethylaminoethoxy)-acetophenone·HCl were reacted with 3.9 grams of paraformaldehyde and 20.3 grams of 4-hydroxynorephedrine·HCl and worked up as in Example 1. Yield 17 grams of the dihydrochloride, M.P. 204–205° C.

EXAMPLE 5

β-[1-(4-hydroxyphenyl)-1-hydroxypropyl-(2)-amino]-3-methoxy-5-[3-dimethylamino-propoxy]-propiophenone

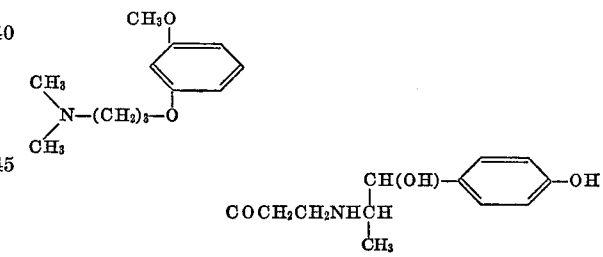

28.8 grams (0.1 mol) of 3 - methoxy-5-(3-dimethylaminopropoxy)-acetophenone·HCl were reacted with 3.9 grams of paraformaldehyde and 20.3 grams of 4-hydroxynorephedrine·HCl and worked up as in Example 1 except that the recrystallization was from ethanol. Yield 13 grams of dihydrochloride, M.P. 162–165° C.

EXAMPLE 6

β-[1-(4-hydroxyphenyl)-1-hydroxypropyl-(2)-amino]-4-[3-dimethylaminopropoxy]-propionaphthone-(1)

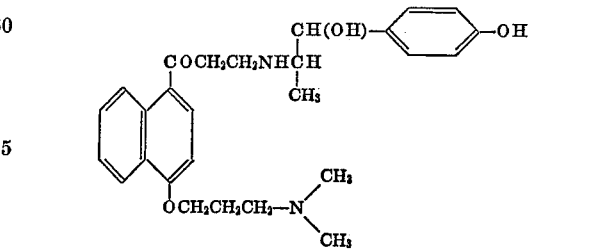

11 grams (0.035 mol) of 4-[3-dimethylaminopropoxy]-acetonaphthone·HCl, 1.5 grams (0.05 mol) of paraformaldehyde and 7.1 grams (0.035 mol) of p-hydroxynorephedrine·HCl were heated on the water both for 3 hours in 2-butanol. The solvent was distilled off and the residue crystallized from ethanol. The dihydrochloride was heated with ethanol and crystallized from methanol/water. M.P. 216-217° C.

As shown by Examples 1-6 in the presently preferred form of the invention at least one of $R_{12}$ and $R_{13}$ is hydroxy.

What is claimed is:

1. A compound selected from the group of compounds having the formula

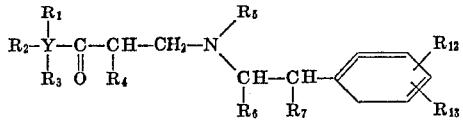

where $R_2$ and $R_3$ are selected from the group consisting of hydrogen, methoxy and nitro, Y is selected from the group consisting of phenyl $R_4$ is hydrogen, methyl and ethyl, $R_5$ and $R_6$ are selected from the group consisting of hydrogen and methyl, $R_7$ is hydroxy, $R_{12}$ is hydroxy, $R_{13}$ is selected from the group consisting of hydrogen, hydroxy and lower alkyl and $R_1$ is selected from the group consisting of $$-O-alk-OH$$

and

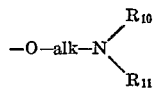

wherein alk is selected from the group consisting of lower alkylene and hydroxy lower alkylene and $R_{10}$ and $R_{11}$ individually are selected from the group consisting of hydrogen, lower alkyl and lower alkenyl, and their pharmacologically acceptable acid addition salts.

2. A compound according to claim 1 wherein $R_4$ and $R_5$ are hydrogen, $R_6$ is methyl and $R_7$ is hydroxy.

3. A compound according to claim 2 wherein $R_{12}$ is hydroxy, $R_{13}$ is hydrogen, $R_2$ is hydrogen, $R_3$ is selected from the group consisting of hydrogen and methoxy, $R_1$ is

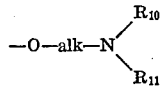

alk is lower alkylene and $R_{10}$ and $R_{11}$ are selected from the group consisting of lower alkyl and lower alkenyl.

4. A compound according to claim 3 wherein $R_{10}$ and $R_{11}$ are selected from the group consisting of methyl and allyl and alk is an alkylene group of 2 to 4 carbon atoms.

5. A compound according to claim 1 wherein $R_{12}$ is hydroxy and $R_{13}$ is alkyl of 1 to 6 carbon atoms.

6. A compound according to claim 1 wherein $R_{12}$ and $R_{13}$ are both hydroxy.

7. A compound according to claim 1 wherein $R_{13}$ is hydrogen.

8. A compound according to claim 1 wherein $R_{13}$ is hydrogen, hydroxy or lower alkyl of at least two carbon atoms.

References Cited

UNITED STATES PATENTS

| | | | |
|---|---|---|---|
| 2,904,591 | 9/1959 | Hanell et al. | 260—570.5 |
| 2,997,472 | 8/1961 | Janssen | 260—570.5 X |
| 3,462,444 | 8/1969 | Beckett et al. | 260—570.5 X |
| 3,225,095 | 12/1965 | Thiele | 260—570.5 |
| 3,337,626 | 8/1967 | Thiele et al. | 260—570.5 |
| 3,139,430 | 6/1964 | Bolhofer et al. | 260—247.7 |
| 3,453,313 | 7/1969 | Margot et al. | 260—570.5 X |
| 3,470,301 | 9/1969 | Gilman | 260—570.5 X |
| 3,536,712 | 10/1970 | Keck et al. | 260—570.5 X |
| 3,322,758 | 5/1967 | Thiele et al. | 260—570.6 X |

FOREIGN PATENTS

| | | | |
|---|---|---|---|
| 1,094,461 | 12/1967 | Great Britain | 260—570.5 |
| 1,094,462 | 12/1967 | Great Britain | 260—570.5 |

OTHER REFERENCES

Burger, "Medicinal Chemistry," 2nd. Ed. p.p. 82-3 and 597-598 (1960).

ROBERT V. HINES, Primary Examiner

U.S. Cl. X.R.

260—247.5 (R), 247.7 (A), 296 (AE), 297 (R), 501.18, 501.19, 567.6 (m), 567.6 (P), 570.6, 570.8 (R); 424—248, 267, 330

UNITED STATES PATENT OFFICE
CERTIFICATE OF CORRECTION

Patent No. 3,829,469   Dated August 13, 1974

Inventor(s) Kurt Thiele and Klaus Posselt

It is certified that error appears in the above-identified patent and that said Letters Patent are hereby corrected as shown below:

On Title page, in the heading add priority data:

[30]   May 18, 1968        Germany                    1768500

Signed and Sealed this

Twenty-sixth Day of October 1976

[SEAL]

Attest:

RUTH C. MASON
*Attesting Officer*

C. MARSHALL DANN
*Commissioner of Patents and Trademarks*